United States Patent [19]

Schmidt

[11] Patent Number: 4,581,660
[45] Date of Patent: Apr. 8, 1986

[54] CIRCUIT ARRANGEMENT FOR RETRIEVING DATA CONTAINED IN BINARY DATA SIGNALS

[75] Inventor: Herbert Schmidt, Neukeferloh, Fed. Rep. of Germany

[73] Assignee: Siemens Aktiengesellschaft, Berlin & Munich, Fed. Rep. of Germany

[21] Appl. No.: 612,067

[22] Filed: May 18, 1984

[30] Foreign Application Priority Data

Jun. 23, 1983 [DE] Fed. Rep. of Germany ....... 3322623

[51] Int. Cl.[4] .......................... G11B 5/02; G11B 5/09
[52] U.S. Cl. ........................................ 360/46; 360/51; 360/67
[58] Field of Search ....................... 360/46, 67, 39, 55, 360/48, 42, 45

[56] References Cited

U.S. PATENT DOCUMENTS 3,719,934  3/1973  Behr et al. ..................... 360/42 X

FOREIGN PATENT DOCUMENTS 0091206  10/1983  European Pat. Off. ............. 360/67
2135320   1/1973  Fed. Rep. of Germany ........ 360/67
2221134  11/1973  Fed. Rep. of Germany .
2041703   9/1980  United Kingdom .................. 360/46

Primary Examiner—Raymond F. Cardillo
Assistant Examiner—Alyssa H. Bowler
Attorney, Agent, or Firm—Hill, Van Santen, Steadman & Simpson

[57] ABSTRACT

A circuit arrangement for retrieving data contained in binary data signals contains an integration stage that at least partially integrates and limits the binary data signals an outputs sample signals to a following phase control circuit, the sample signals being allocated to the integrated and limited data signals. The integration stage outputs further data signals allocated to the integrated and limited data signals to a decoder stage which retrieves the data by use of reference signals output by the phase control circuit. The time constant in the integration and the pulse duration of the sample signals are varied according to the frequency of the reference signals output by the oscillator. They are varied by use of switch stages that are designed in correspondence with an oscillator in the phase control circuit.

11 Claims, 7 Drawing Figures

CIRCUIT ARRANGEMENT FOR RETRIEVING DATA CONTAINED IN BINARY DATA SIGNALS

BACKGROUND OF THE INVENTION

The invention relates to a circuit arrangement for retrieving data contained in binary data signals wherein a phase control circuit generates reference signals allocated to the data signals in terms of phase and frequency. An integration stage is provided and a decoder stage retrieves the data contained in the data signals by use of the reference signals.

A circuit arrangement for retrieving data contained in binary data signals is known from German OS No. 22 21 134, incorporated herein by reference, wherein the binary data signals are multiplied by reference signals generated in a phase control circuit. The product of the two signals is subsequently integrated and the operation sign of the integration is interrogated in a decoder stage at prescribed points in time in order to retrieve the data contained in the binary data signals.

The known circuit arrangement permits a largely trouble-free recognition of the data contained in the data signals insofar as the reference signals exhibit no phase deviation relative to the nominal progressions of the data signals. Since the phase control circuit however is driven by the potentially disrupted data signals, the phase relation between the reference signals output by the phase control circuit and the data signals is, for example, constantly disturbed due to additional signal edges. The disturbing influence mainly depends on the spacing between the noise and nominal edges of the data signals.

SUMMARY OF THE INVENTION

It is an object of the invention to provide a circuit arrangement which enables the accuracy in the retrieval of the data contained in the binary data signals to be even further improved.

Given the circuit arrangement of the type initially cited, this object is achieved according to the invention by providing an integration stage means for at least partially integrating and limiting the data signals and for outputting sample signals allocated to the integrated and limited data signals to the phase control circuit means, and for also outputting further data signals to a decoder stage means.

The circuit arrangement according to the invention has the advantage that due to the integration, the data signals are rid of noise signals, i.e. of additional edges, and the synchronization of the reference signals is related to the edges of the noise-free data signals. The disturbing influence is thus less dependent on the spacing of the noise signals from an edge of a read signal than on the pulse duration of the noise signals, or is only dependent on their mean value within an integration time span. The circuit arrangement proves to be particularly expedient when amplified and bounded read signals of magnetic layer storages, for example magnetic tape storages, are employed as data signals. In this case, the basic frequency of the data signals can fluctuate by more than ±20% as a consequence of fluctuations in tape speed, so that it can be advantageous to vary the integration time constants as a function of the basic or fundamental frequency of the data signals. The pulse duration of the sampling signals is also expediently varied in accordance with the basic or fundamental frequency of the data signals.

The integration of the data signals can be executed in both directions as a function of the respective binary value, whereby the integration is terminated when a respective limiting value allocated to the respective binary value is reached. It proves expedient, however, to only execute the integration in one direction when a limiting value allocated to the other integration direction has previously been reached.

A particularly simple structure of the circuit arrangement is achieved since a switch stage defining the integration time constants and/or defining the pulse duration of the sampling signals is designed in a manner similar to an oscillator present in the phase control circuit. Also, the switch stages, in a manner corresponding to that of the oscillator, are driven by the manipulated variable of the phase control circuit as a function of the frequency of the reference signals. The switch stages and the oscillator preferably comprise a capacitor that is charged and discharged by current sources controlled by the manipulated variable of the phase control circuit and comprise at least one comparator that compares the respective voltage at the capacitor to at least one threshold voltage and emits output signals given upward and downward movement of the threshold voltage.

BRIEF DESCRIPTION OF THE DRAWINGS

FIG. 4 is a circuit diagram of an oscillator and of a control stage;

DESCRIPTION OF THE PREFERRED EMBODIMENTS

Figure 1:
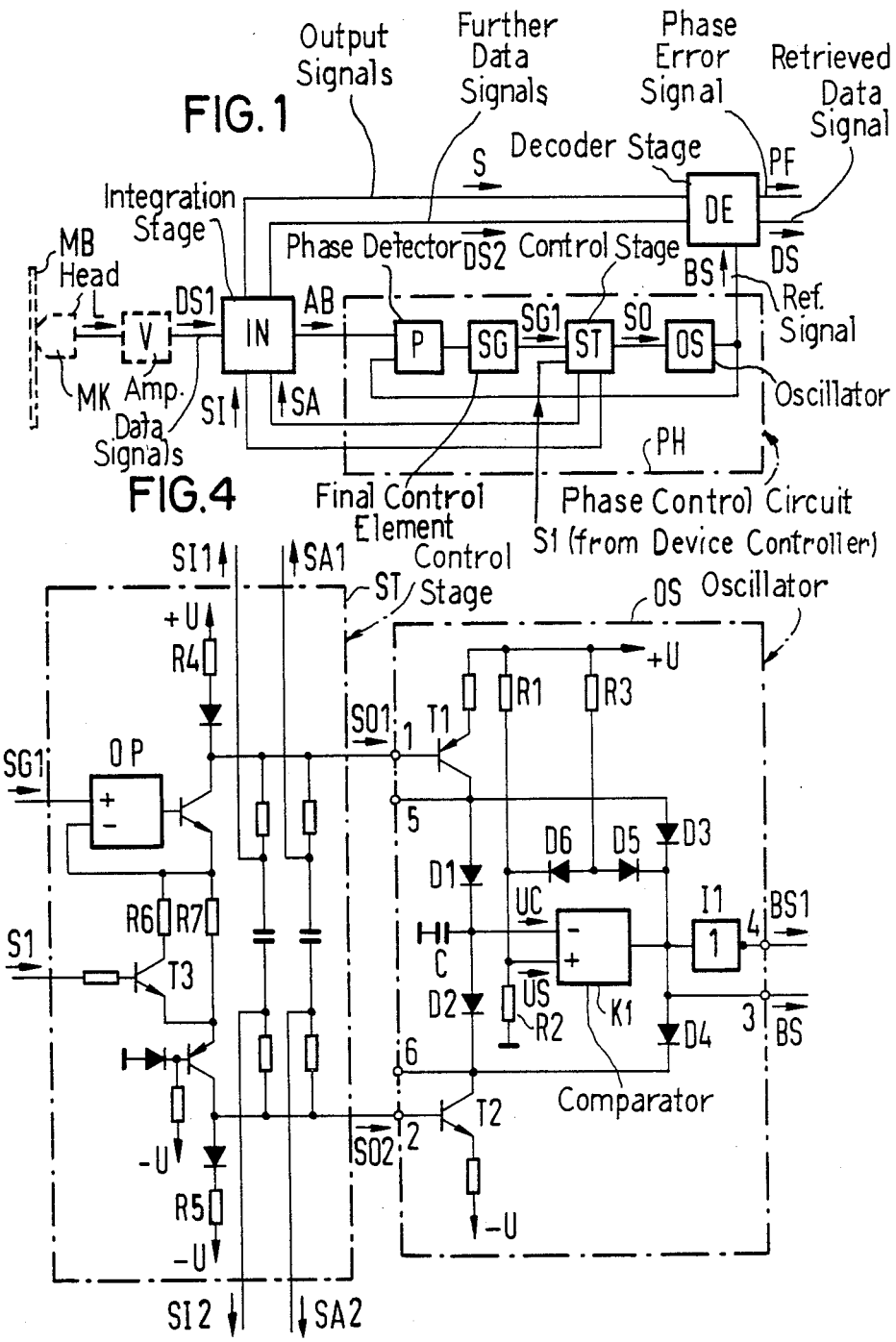
FIG. 1 is a block diagram of the circuit arrangement according to the invention.

Given the circuit arrangement shown in FIG. 1, data are read from a magnetic layer, for example from a magnetic tape MB, upon employment of a magnetic head MK. The data are contained in coded fashion in read output signals L. The read output signals L are amplified, differentiated, filtered under given conditions, and limited in an amplifier V. The part of the circuit arrangement described up to now does not form part of the invention and is therefore shown with broken lines in FIG. 1. The summarily explained components of a read means of a magnetic tape are notoriously known and are part of conventional tape recorders; they are therefore not in need of detailed description within the framework of the invention.

The read output signals L processed by the amplifier are converted into data signals DS1 which the amplifier emits at its output. These data signals DS1 are supplied to an integration stage IN that at least partially integrates and limits the data signals DS1. The stage IN emits sample signals AB to a phase control circuit PH known per se and also outputs further data signals DS2 to a known decoder stage DE that retrieves the data from the further data signals DS2 upon employment of reference signals BS output by the phase control circuit PH and emits said retrieved data in the form of data signals DS. Further output signals S are also supplied to the decoder stage DE by the integration stage IN, said further signals S allowing a phase error to be indicated by means of a corresponding phase error signal PF given too great a phasewise deviation between the data signals DS2 or the sample signals AB and the reference signals BS.

The phase control circuit PH, as known, contains a phase detector P, a final control element SG, and an oscillator OS that generates the reference signals BS. In addition, the phase detector PH contains a control stage ST that, on the one hand, outputs the manipulated variable SG1 to the oscillator OS as a control voltage SO and, on the other hand, outputs control voltages SI and SA to the integration stage IN in order to match the integration time constants or the pulse duration of the sample signals AB to a basic or fundamental frequency of the data signals DS1 or to the frequency of the reference signals BS.

Figure 2:
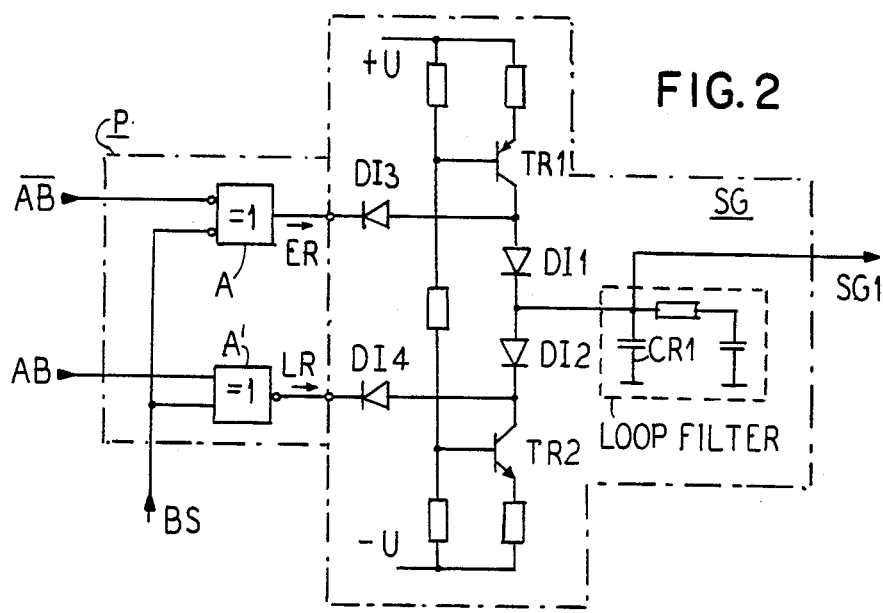
FIG. 2 is a circuit diagram of a phase detector and of a final control element from FIG. 1.
Figure 3:
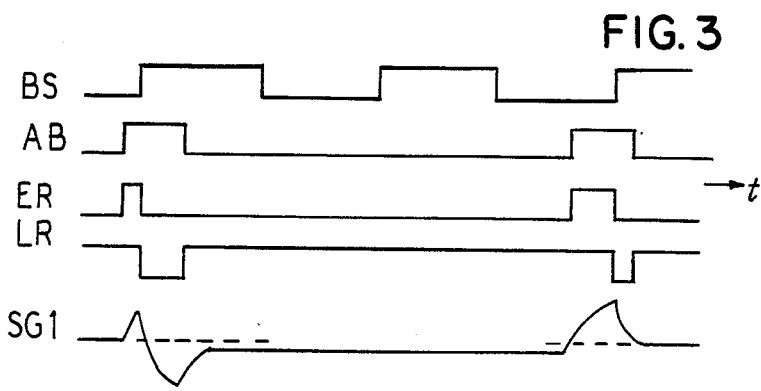
FIG. 3 shows time diagrams of input and output signals of the phase detector.

An exemplary embodiment of the phase detector P and of the final control element SG is shown in FIG. 2. Both assemblies are conventional components of a phase control circuit known per se and are incorporated into the drawing here only for the sake of completeness. The phase detector P is constructed of two AND elements A and A' to whose first inputs the fedback reference signals BS are supplied in parallel. The sample signals output by the integration stage are received at the second inputs of the AND elements, said sample signals being referenced $\overline{AB}$ as the inverted signal or, respectively, AB as the normal signal. An output signal of the one AND element accordingly supplies a first phase error signal (early error) ER that identifies a leading of the phase of the sample signals relative to the reference signals. The corresponding output signal of the other AND element A' supplies a second phase error signal (late error) that reflects the opposite conditions. This interrelationship can again be derived from the time diagrams of the input signals and output signals of the phase detector P which are shown in FIG. 3.

The final control element SG then processes these output signals of the phase detector P and forms the analog manipulated variable SG1 therefrom. For this purpose, the final control element contains two current sources lying at positive or, respectively, negative operating voltages +U, −U, said voltage-sources consisting of a respective transistor TR1 or TR2 with allocated load resistor. Since they are decoupled via diodes DI1 or DI2, both current sources act on a common output to which a conventional loop filter is connected.

Alternately, one of the two current sources is switched on via further coupling diodes DI2 or DI4 in order to charge or discharge the capacitor CR1 of the loop filter which, together with the series resistance, represents the element which adjusts the phase. The manipulated variable SG1 emitted at the output of the loop filter then varies in a corresponding fashion. The last line of FIG. 3 shows the variation of the manipulated variable SG1 as a function of the output signals ER or LR of the phase detector P.

The oscillator OS shown in FIG. 4 represents a physical unit of the circuit arrangement which, in a corresponding execution as a switch stage as well, is employed in the integration stage IN for integrating the data signals DS1 and for generating the sample signals AB.

The oscillator OS contains two current sources comprised by the transistors T1 and T2, said current sources being controlled by the control signals SO1 and SO2 output by the control stage ST and adjacent to the junctions 1 and 2. A capacitor C is alternately charged or discharged across the transistors T1 and T2. A comparator K1 constantly compares the voltage UC at the capacitor C to a threshold voltage US generated by means of a voltage divider comprised of the resistors R1 and R2. The comparator K1 outputs the reference signals BS at its output 3. Further details shall be disbussed together with the time diagrams illustrated in FIG. 5.

Figure 5:
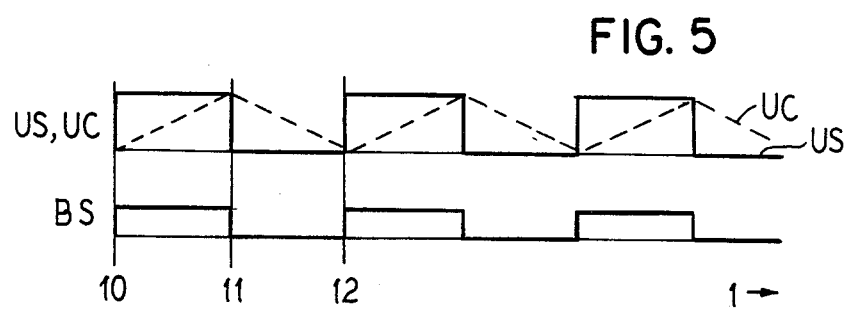
FIG. 5 shows time diagrams of signals at various points of the oscillator.

At point in time t0 in FIG. 5, the capacitor C is charged via the transistor T1 and a diode D1. At this point in time, the reference signal BS exhibits the binary value 1 so that the diodes D2 and D3 are inhibited. Via the diode D4, the comparator K1 accepts the current of the transistor T2. The diode D5 is likewise inhibited and a current flows across the resistor R3 and the diode D6 so that the threshold voltage US exhibits a relatively high value.

When the voltage UC reaches the high threshold voltage US at point in time t1, then the output of the comparator K1 assumes the binary value 0. This thus accepts the current from the resistor R3 via the diode D5. The diode D6 now blocks and the threshold voltage assumes a low value. Since the binary signal BS now has the binary value 0 that is allocated to a voltage value that is lower than the voltage US, the diodes D4 and D1 block and the transistor T2 discharges the capacitor C via the diode D2 until the voltage UC falls below the low threshold voltage US at point in time t2. After point in time t2, the same operation as between points in time t0 and t2 is repeated so that the reference signals BS represent periodic rectangular signals.

The frequency of the oscillator OS can be varied by means of the control signals SO1 and SO2, whereby the slope of the voltage UC is varied given constant deviation or shift. The comparator K1 is followed by an inverter I1 that outputs the inverted reference signals BS1 at an output 4. Terminal connecting points 5 and 6 that are additionally wireable given employment of the oscillator OS as corresponding unit in the integration stage IN are provided between the transistor T1 and the diode D1 as well as between the diode D2 and the transistor T2.

The control stage ST also shown in FIG. 4 generates the control signals SO1 and SO2 for the oscillator OS as a function of the manipulated variable SG1 output by the final control element SG. It further generates the control signals SI1 and SI2 or SA1 and SA2 for setting the integration time constants or for setting the pulse duration of the sample signals AB in the integration stage IN. The manipulated variable SG1 whose momentary value corresponds to a basic or fundamental frequency of the data signals DS1 and to the frequency of the reference signals BS is supplied to the control stage ST by the final control element SG. Voltages that are proportional to the manipulated variable fall off at the resistors R4 and R5. These voltages directly control the current sources T1 and T2 by means of the control signals SO1 and SO2. Additional RC filters are provided for generating the control signals SI1 and SI2 as well as SA1 and SA2, respectively, in order to reduce the influence of noise pulses. A change of the control voltages is possible by means of a signal S1 when the transistor T3 is switched conductive and, thus, the resistors R6 and R7 are connected parallel. Given the employment of the circuit arrangement for the retrieval of data recorded on the magnetic tape MB, the control signal S1 serves, for example, to switch over the frequency of the reference signals BS given employment of different recording methods. For example, the frequency of the reference signals BS is increased to about triple its value by the signal S1 when the data are recorded according to the GCR method instead of the phase encoding method.

Figure 6:
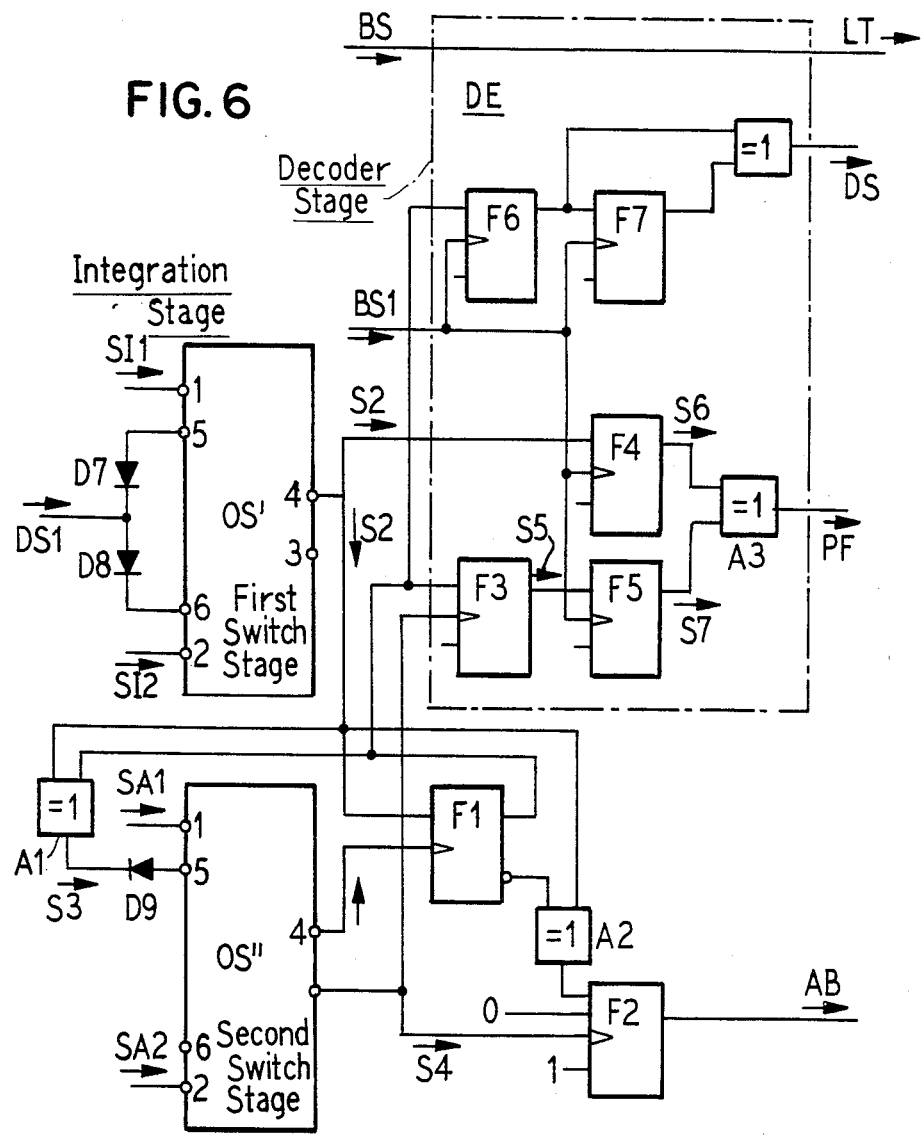
FIG. 6 is a circuit diagram of an integrating stage.

The integration stage illustrated in FIG. 6 contains two switch stages OS' and OS" whose structure is identical to the structure of the oscillator OS. The switch stage OS' serves for the integration of the data signals DS1, and the switch stage OS" serves for generating the sample signals AB. FIG. 6 also shows an embodiment of the decoder stage DE, and particularly that part that serves to generate a phase error signal PF. Further details of the integration stage IN shown in FIG. 6 shall be described below with reference to the time diagrams shown in FIG. 7.

Figure 7:
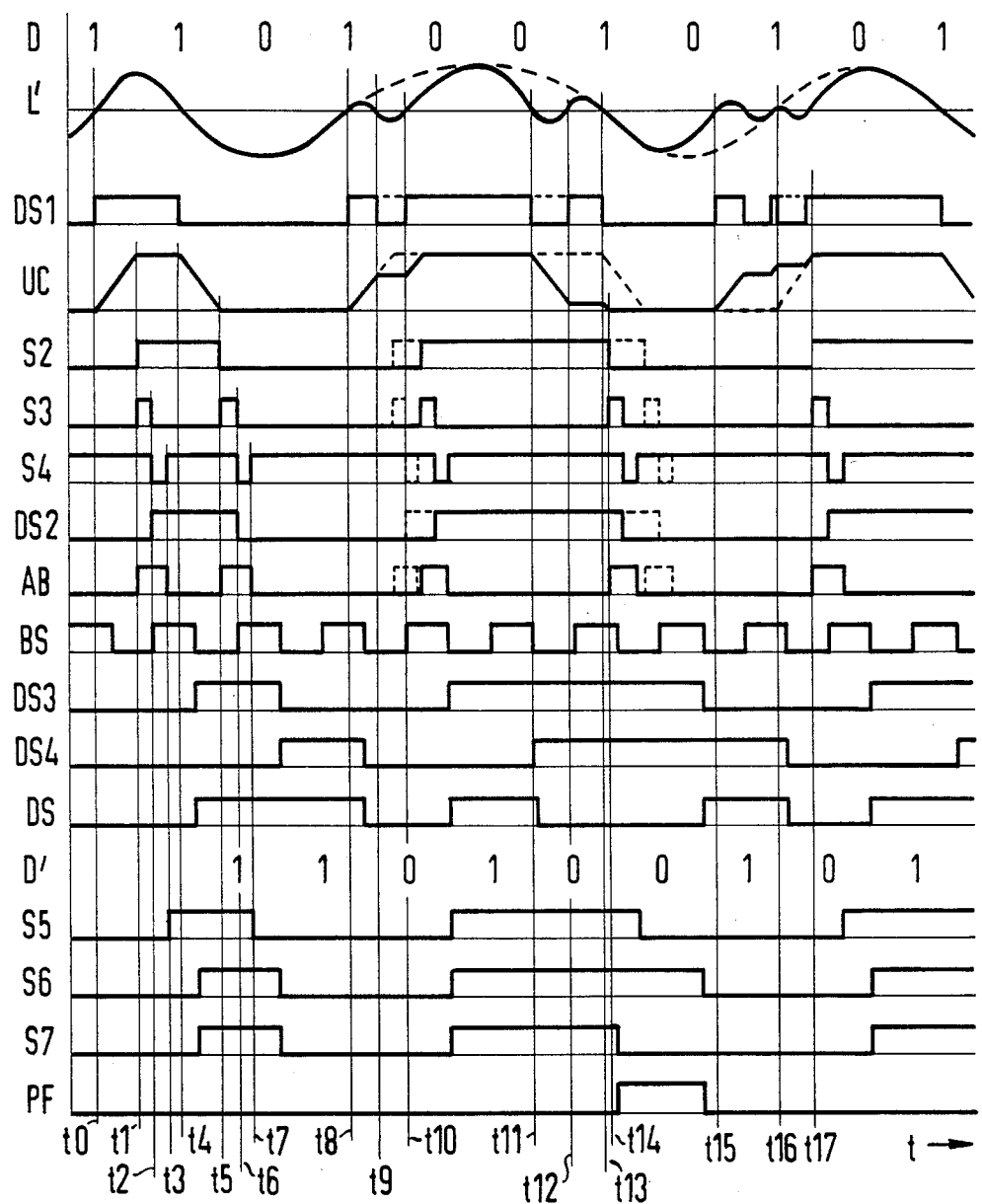
FIG. 7 shows time diagrams of signals at various points of the circuit arrangement.

It is assumed in the time diagrams illustrated in FIG. 7 that a prescribed data sequence D has been recorded on the magnetic tape MB in accordance with the generally known GCR method. The read output signals L output by the magnetic head MK, and in which the data are contained in coded fashion, are amplified and differentiated in the amplifier V. The read output signals L thus become the differentiated read output signals L' that are shown partially disturbed in FIG. 7, the respective undisturbed progression being thus shown with broken lines. The data signals DS1 that correspond to the amplified and limited read output signals are output at the output of the amplifier V. These data signals DS1 are supplied to the integration stage IN.

When the data signal DS1 assumes the binary value 1 at point in time t0, the diode D7 connected to the terminal connecting point 5 is inhibited and the capacitor C' in the switch stage OS' is charged. The slope with which the capacitor C' is charged is defined by the control signal SI1. At point in time t1, the voltage UC at the capacitor C reaches the high threshold value US so that the charging is terminated and the signal S2 at the output of the switch stage OS' assumes the binary value 1 and keeps the diode D2' inhibited via the diode D8. Simultaneously, the threshold voltage US is switched to the low value. The discharge of the capacitor C, however, is not yet commenced since the data signal DS1 still has the binary value 1.

A signal S3 at the output of an exclusive-OR element A1 likewise assumes the binary value 1 at point in time t1. Via a diode D9, the signal S3 drives the switch stage OS" at which the capacitor C" is now likewise charged. When this has been charged by point in time t2, a signal S4 at the output of the switch stage OS" assumes the binary value 0 and the capacitor C" is in turn discharged. The signal corresponding to the inverted signal S4 is supplied to a flip-flop F1 that is set. The flip-flop F1 emits the data signal DS2 at its non-inverting output, said data signal DS2 being supplied, on the one hand, to the decoder stage DE and, on the other hand, to the exclusive-OR element A1. The exclusive-OR element A1 combines the data signal DS2 with the signal S2 in order to generate the signal S3. The signal at the inverting output of the flip-flop F1 is supplied to a first input of a further exclusive-OR element A2 at whose second input the signal S2 is adjacent. The output signal of this exclusive-OR element A2 sets a flip-flop F2 which is respectively reset with the leading edge of the signal S4. The flip-flop F2 emits the sample or sampling signals AB at its output, said sample or sampling signals AB being supplied to the phase detector P of the phase control circuit PH. The phase control circuit PH generates the reference signals BS that are regulated in terms of frequency and phase such that the leading edge falls as precisely as possible into the center of the sample or sampling signal AB, as shown at point in time t2.

The signal S4 has the binary value 0 during a time span of approximately 10% of the period duration of the reference signals BS. The sample signal AB is terminated at point in time t3 with the leading edge of the signal S4, and the signal S5 that corresponds to the delayed data signal DS2, assumes the binary value 1 at the output of a flip-flop F3. Together with the signal S2, this signal S5 serves for the generation of the phase error signal PF.

The data signal DS1 assumes the binary value 1 at point in time t4. The diode D8 connected to the terminal connecting point 6 is inhibited and the discharge of the capacitor C' of OS' is initiated. The discharge is concluded by point in time t5 and the signal S2 assumes the binary value 0. A signal S3 and a sample or sampling signal AB are then generated. At point in time t6, the data signal DS2 again assumes the binary value 0 so that the signal S3 is concluded and the signal S4 again takes on the binary value 0. At point in time t7 the signal S4 is concluded and the signal S5 takes on its binary value 0. After the point in time t8, similar events repeat themselves as at the point in time t0. It is, however, assumed that the data signal DS1 between the points in time t9 and t10 as well as between the points in time t11 and t12 exhibits disturbances. The capacitor C' in the switch stage OS' is therefore not charged up between the points in time t9 and t10. It does not discharge because the voltage UC at the capacitor C' has not yet reached the high threshold value US. Only when the voltage UC after the point in time t10 has reached the threshold value US does the signal S2 take on the binary value 1, and a signal S3 and a sample signal AB are then generated. The ideal path is shown by the signals UC and S2 illustrated with broken lines. As a consequence of the disturbance, the sample signal AB is shifted.

The capacitor C' of OS' is already prematurely discharged as a consequence of the disturbance between points in time t11 and t12. No further discharge, however, occurs between points in time t12 and t13 because the capacitor C' has not yet been discharged down to its low threshold value US. The capacitor C' is not completely discharged until point in time t14 after the data signal DS1 has again assumed the binary value 0. A signal S3 and a sample signal AB are therefore generated at point in time t14. This sample signal AB is likewise shifted relative to the position it should be in. This is shown with broken lines.

Further disturbances are assumed to exist at points in time t15 and t16. Events similar to those after point in time t8 again sequence after point in time t15 so that the signal S2 again assumes the binary value 1 at point in time t17, and a signal S3 and a sample signal AB are generated. The sample signal AB is not shifted relative to the reference signals BS in terms of phase, since the influence of the disturbances at points in time t15 and t16 mutually cancel.

The decoder stage DE samples the data signals DS2 in a known manner upon employment of the reference signals BS1. The momentary value of the respective data signals DS2 is interrogated with every leading edge of a reference signal BS1, i.e. a flip-flop F6 is set, the output signal thereof producing the data signal DS3. This data signal DS3 is subsequently delayed by the period duration of the reference signals BS1 with the assistance of a further flip-flop F7 so that the data signal DS4 arises as the output signal of said further flip-flop F7. A combination of the data signals DS3 and DS4 with the assistance of a logic element A4 yields the data signals DS whose binary values at the points in time of the trailing edge of the reference signals BS1 or BS specify the retrieved data D'. The reference signals BS are also converted into a read clock LT in the decoder stage DE, as schematically indicated.

A flip-flop F4 is respectively set or reset with the leading edge of the reference signals BS1 when the signals S2 exhibit the binary value 1 or the binary value 0. A flip-flop F5 is set or reset in a corresponding manner when the signals S5 exhibit the binary value 1 or 0. The output signals S5 exhibit the binary value 1 or 0. The output signals S6 and S7 of the flip-flops F4 and F5 are supplied to a coincidence element A3 that indicates a phase error with the signal PF at its output when, as after point in time t14, the sample pulse AB exhibits an impermissably large phase shift relative to a reference signal BS.

The oscillator OS as well as the switch stages OS' and OS" could also be designed such that two comparators are employed, these comparing the voltage US at the capacitor C' to two different threshold voltages that are generated by voltage dividers from the operating voltages +U and −U. In this case, the outputs of the two comparators would be supplied to a flip-flop that is alternately set and reset. The diodes D3 and D4 would then be connected to an output of the flip-flop. In case the diodes D3 and D4 were to be connected to the outputs of the respective comparators, this would result in the fact that the integration of the data signals DS1 would be executed between the limiting values independently of whether the voltage UC had previously reached one of the threshold voltages. In accordance with FIG. 7, the voltage UC would then decrease or increase after the points in time t9 or t12 as a consequence of the disturbance and would not remain constant as shown in FIG. 7. Such a design of the circuit arrangement proves expedient particularly when the differentiated read output signal L' exhibits further zero-axis crossings which shall occur.

The control signals SI1 and SI2, or SA1 and SA2, are present at the terminal connecting points 1 and 2 of the switch stages OS' and OS" in order to vary the integration time constant or the pulse duration of the sample signals AB as a function of a basic frequency of the data signals DS1 or as a function of the frequency of the reference signals BS. This occurs since the slope with which the capacitor C' or C" respectively in the switch stages OS' and OS" is charged is varied. The integration time constant is preferably set such that the voltage UC at the capacitor C' in the switch stage OS' normally reaches one of the limiting values after respectively half the period duration of the reference signals BS.

Although various minor changes and modifications might be proposed by those skilled in the art, it will be understood that I wish to include within the claims of the patent warranted hereon all such changes and modifications as reasonably come within my contribution to the art.

I claim as my invention:

1. A circuit arrangement for retrieving data contained in a self clocking pulse train of binary data signals representing data information and clocking information recorded on a medium with a fundamental pulse frequency, comprising:

an integration stage means for deriving sample signals and further data signals from the binary data signals input thereto, said integration stage means being controlled by control signals input thereto for determining at least one of the parameters integration time constant of said integration stage means and pulse duration of said sample signals, said control signals permitting variance of at least one of said parameters as a function of said fundamental pulse frequency of the pulse train;

a phase control circuit means for providing a phase control loop and having an input receiving said sample signals and for generating reference signals related to the binary data signals in terms of phase and frequency, and also for generating said control signals for varying the integration time constant or the pulse duration of the sample signals; and a decoder stage means for retrieving the data contained in the binary signals from said further data signal by use of said reference signals.

2. A circuit arrangement according to claim 1 wherein the integration stage means includes a first switch stage means for integration of the binary data signals and a second switch stage means for generating said sample signals, an oscillator in the phase control circuit means for generating said reference signals, and wherein the first and second switch stage means are designed similar to the oscillator and are driven as is the oscillator by a manipulated variable of the phase control circuit means via a control stage.

3. A circuit arrangement according to claim 2 wherein the oscillator and the first and second switch stage means contain a respective capacitor that is charged and discharged by current sources controlled by said manipulated variable of the phase control circuit means and contain at least one comparator means for comparing a voltage at the capacitor to at least one threshold voltage, and outputs the reference signals associated with the oscillator and first and second output signals associated with the first and second switch stage means given upward or downward movement of the threshold voltage.

4. A circuit arrangement according to claim 1 wherein the integration stage means generates output signals whose binary values always change when the integrated and limited data signals have respectively reached one of two limiting values.

5. A circuit arrangement according to claim 4 wherein the integration stage means outputs the sample signals at every change of said output signals.

6. A circuit arrangement according to claim 4 wherein said further data signals are output from the integration stage means which correspond to the output signals.

7. A circuit arrangement according to claim 1 wherein the decoder stage means contains switch element means for generating a phase error signal given a faulty phasewise allocation between the sample signals and the reference signals when a phase deviation therebetween is greater than a given value.

8. A circuit arrangement according to claim 1 wherein amplified, differentiated, and limited read output signals of a magnetic layer storage are provided as the data signals.

9. A circuit arrangement according to claim 8 wherein a magnetic tape recorder is provided as the magnetic layer storage, data being recorded on a magnetic tape by means of said magnetic tape recorder according to given pulse encoded methods.

10. A circuit arrangement for retrieving data contained in a self clocking pulse train of binary data signals representing data information and clocking information recorded on a medium with a fundamental pulse frequency, comprising:

an integration stage means for deriving sample signals and further data signals from the binary data signals input thereto, said integration stage means being controlled by control signals input thereto for determining at least one of the parameters integration time constant of said integration stage means and pulse duration of said sample signals, said control signals permitting variance of at least one of said parameters as a function of said fundamental pulse frequency of the pulse train;

a phase control circuit means for providing a phase control loop and having an input receiving said sample signals and for generating reference signals related to the binary data signals in terms of phase and frequency, and also for generating said control signals for varying the integration time constant or the pulse duration of the sample signals;

a decoder stage means for retrieving the data contained in the binary signals from said further data signals by use of said reference signals; and the integration stage means including a first switch stage means for integration of the binary data signals and a second switch stage means for generating said sample signals, and the phase control circuit means including an oscillator for generating said reference signals, and wherein the first and second switch stage means are designed similar to the oscillator and, are driven as is the oscillator by a manipulated variable of the phase control circuit means via a control stage.

11. A circuit arrangement according to claim 10 wherein the oscillator and the first and second switch stage means contain a respective capacitor that is charged and discharged by current sources controlled by said manipulated variable of the phase control circuit means and contain at least one comparator means for comparing a voltage at the capacitor to at least one threshold voltage, and outputs the reference signals associated with the oscillator and first and second output signals associated with the first and second switch stage means given upward or downward movement of the threshold voltage.

* * * * *